United States Patent [19]

O'Mahoney, Jr.

[11] 4,257,934
[45] Mar. 24, 1981

[54] FLEXURAL MODULUS PAINTABLE RUBBER COMPOSITION

[75] Inventor: Joseph F. O'Mahoney, Jr., Stone Mountain, Ga.

[73] Assignee: The Goodyear Tire & Rubber Company, Akron, Ohio

[21] Appl. No.: 92,246

[22] Filed: Nov. 7, 1979

[51] Int. Cl.³ .............................................. C08L 93/00
[52] U.S. Cl. .............................. 260/27 BB; 525/133; 525/185; 525/206; 525/211; 525/227
[58] Field of Search .................. 260/27 BB; 525/133, 525/185, 206, 211, 227

[56] References Cited

U.S. PATENT DOCUMENTS

| | | | |
|---|---|---|---|
| 3,402,140 | 9/1968 | Bickel et al. | 525/185 |
| 3,634,352 | 1/1972 | Mueller et al. | 260/27 BB |
| 3,741,924 | 6/1973 | Okita et al. | 525/133 |
| 4,020,038 | 4/1977 | O'Mahoney | 525/211 |
| 4,102,855 | 7/1978 | Kuan et al. | 525/211 |

*Primary Examiner*—H. S. Cockeram
*Attorney, Agent, or Firm*—J. D. Wolfe

[57] ABSTRACT

This invention provides a composition comprising a blend of EPDM, styrene-butadiene rubber and styrene-butadiene resins that has improved modulus in the vulcanizates by the incorporation into the composition of about 1 to 20 parts per 100 of a tackifying resin, the tackifying resin being one of those normally utilized to improve the tack of the rubber.

8 Claims, No Drawings

FLEXURAL MODULUS PAINTABLE RUBBER COMPOSITION

TECHNICAL FIELD

This invention relates to compounded EPDM/SBR/SB resin mixtures that exhibit in cured state greatly enhanced modulus values, wherein EPDM designates an ethylenepropylene dimer rubber, SBR designates a rubbery copolymer of styrene-butadiene and SB resin designates a nonrubbery copolymer of styrene-butadiene having at least 80 percent styrene.

BACKGROUND ART

Generally the vulcanizates of EPDM/SBR/SB resin blends have a modulus of 10,000 to 17,000 pounds per square inch. This is a decided disadvantage as these vulcanizates are finding commercial use as stiff flexible components in automotive body parts and as paints for flexible parts.

DISCLOSURE OF INVENTION

It was discovered that the modulus of the vulcanizates of EPDM/SBR/SB resin blends could be increased by at least 10 percent, and in many cases by 100 percent or more, by including a small amount of a nonreinforcing resin of the tackifier class in the blend. This is indeed unexpected and unobvious as generally these nonreinforcing aromatic resins, such as the so-called tackifier resins, act as diluents and reduce the physical properties of the resulting vulcanizates.

Representative classes of the nonreinforcing resins of the tackifier class useful in this invention are the coal tar resins, petroleum resins, polyterpene resins and the aromatic resins. Some specific examples of these resins are the coumarone-indene resins, polystyrenated aromatic resins, polynuclear aromatic resins, alkyl aromatic hydrocarbon resins, phenolic modified terpene resins, polymerized rosin esters, styrene acrylic comonomer resins, α-methylstyrene resins, solvent pine resin (available under the trademark Vinsol), phenolic modified terate resins, and diphenyl and polyphenyl aromatic hydrocarbons. These resins normally have melting points of about 100° C. to 165° C. The higher the melting point the more pronounced the enhancement of modulus. Usually 1 to 20 parts of nonreinforcing aromatic resin per 100 parts of rubber (phr), viz. the three component blend, can be used with the preferred range being 3 to 6 phr.

BEST MODE FOR CARRYING OUT THE INVENTION

The nature of this invention can be more fully appreciated from the following representative examples wherein all parts and percentages are by weight unless otherwise indicated.

For convenience of illustration a master recipe is set forth below to which the nonreinforcing aromatic resins are added to give the compounded rubbers of this invention but it should be appreciated that in practice the rubber compounder might prefer to add the ingredients of the recipe in a different manner or order during the compounding, for instance on the mill.

The master recipe has the following composition:

| Ingredient | Parts |
|---|---|
| Styrene-butadiene rubber | 60.00 |
| Butadiene-styrene resin, 17.5% butadiene | 25.00 |
| EPDM rubber | 40.00 |
| Carbon black FEF | 80.00 |
| Zinc oxide | 5.00 |
| Stearic acid | 2.00 |
| Antioxidant, phenolic type | 1.00 |
| Accelerator, sulfenamide type | 1.75 |
| Scorch inhibitor (optional ingredient) | 0.15 |
| | 217.90 |

This master recipe yielded a vulcanizate having modulus values of less than 17,000 but when various nonreinforcing tackifying resins were added the modulus was greatly enhanced.

EXAMPLE 1

When 1 part of polynuclear aromatic resin of 100° C. melting point, 4 parts coumarone-indene resin of 100° C. melting point was compounded on the mill into 217.9 parts of the above composition of the recipe the resulting vulcanizate, 12 to 15 minutes at 165°, had modulus values in excess of 23,000.

EXAMPLE 2

When the master recipe was varied to increase the butadiene-styrene resin content to 30 parts instead of 25 and the carbon black content was raised to 85 parts and the tackifying resins level raised to 20 parts of coumarone-indene resin of 126° C. melting point the flexural modulus values of the vulcanizate were raised to 38,000 pounds per square inch. When the 126° C. melting point coumarone-indene was replaced in the above modified recipe with the corresponding 155° C. melting point coumarone-indene resin the flexural modulus values of its vulcanizate was 46,000. Likewise when the low melting coumarone-indene resin was replaced by either of the following tackifying resins: alkyl aromatic hydrocarbon resin 110/120° C. melting point (available under the trade name Piccoumaron 110 and 120), phenolic modified terpene resin 125° C. melting point (available under the trade name Piccofyn D125), styrene-acrylic copolymer resin 146° C. melting point (available under the trade name Piccotoner), and alpha methyl styrene resin 120° C. melting point (available under the trade name Kristoflex), the vulcanizates had flexural modulus approaching 30,000 and up to about 45,000.

When pine stump wood resin (available under the trademark Vinsol) 120° melting point is used the paint made from the compound blend tends to be staining, thus higher pigment loadings may be desirable, but the flexural modulus of the vulcanizate is in the 40,000 range or higher.

These experiments illustrate the magnitude of the flexural modulus obtainable in accordance with this invention.

While certain representative embodiments and details have been shown for the purpose of illustrating the invention it will be apparent to those skilled in this art that various changes and modifications may be made therein without departing from the spirit or scope of the invention.

I claim:

1. A composition comprising a blend on a weight percent basis of 30 to 70 percent of an styrene-butadiene rubber, 30 to 70 percent of an EPDM rubber and 40 to 20 percent of a styrene-butadiene resin with about 1 to 20 parts per hundred of said blend of a tackifier resin having a melting point of about 100° to about 165° C.

2. The composition of claim 1 wherein said tackifier is a coumarone-indene resin.

3. The composition of claim 1 wherein said tackifier resin is an alkyl aromatic hydrocarbon resin.

4. The composition of claim 1 wherein said tackifier resin is a phenolic modified terpene resin.

5. The composition of claim 1 wherein said tackifier resin is a styrene-acrylic copolymer resin.

6. The composition of claim 1 wherein said tackifier resin is an α-methyl styrene resin.

7. The composition of claim 1 wherein said tackifier is natural pine stump wood resin.

8. The composition of claim 1 wherein a filler comprises from 5 to 100 parts per 100 of the blend.

* * * * *